Aug. 17, 1965    J. L. JEANNERET    3,200,506
TOOLS SETTING DEVICE
Filed July 25, 1961

United States Patent Office

3,200,506
Patented Aug. 17, 1965

3,200,506
TOOLS SETTING DEVICE
Jules Louis Jeanneret, 13 a 21 Rue H. Gelin,
Niort, Deux-Sevres, France
Filed July 25, 1961, Ser. No. 126,637
Claims priority, application France, Aug. 3, 1960,
834,841
6 Claims. (Cl. 33—185)

This invention relates to devices for presetting the position of tools in a carrier such that when the carrier is installed in a machine, the tools will be accurately positioned and ready for operation.

Devices are already known which are intended to position a tool in advance on a tool carrier so that it may be placed in a specific position while the machine which is to receive this tool is carrying out other work. With this aim, a tool-carrier identical with that of the machine but totally independent therefrom co-operates with measuring instruments of the comparator type, which determine the co-ordinates of the tool in relation to fixed points on the tool carrier.

These previous devices cannot operate with satisfaction when it is necessary to determine the positions of a plurality of tools grouped on the same tool carrier, since these tools are spaced by several centimetres and the feeler of a comparator can travel only a distance of several millimetres. Furthermore for this kind of setting, two comparators are used which act in two directions perpendicular to one another and, if the one acting in the alignment of the tools can come opposite each tool in succession, that which acts perpendicularly of the tools can come into contact with only one.

This impossibility of setting the position of a plurality of tools on the same tool carrier constitutes a serious drawback, for frequently work is carried out on machine tools using a plurality of tools. When, for example, it is necessary to machine a complex piece on a lathe, a plunging carriage is used which supports a plurality of tools which are to operate simultaneously.

The present invention remedies this drawback by permitting the precise setting of the position of a plurality of grouped tools.

For this purpose, the invention has for an object the provision of a setting device of the type comprising, on the one hand, a chassis supporting a tool carrier which is independent but identical with that of a machine tool, and, on the other hand, means for the measurement of the distance of a tool in relation to one or more fixed reference marks on the chassis, this device being characterized in that the chassis comprises means for the rectilinear guidance of a movable slide which supports a feeler which itself is movable in a direction perpendicular to that of the said slide, the effective end of the feeler being cut with at least one right-angled notch, the sides of which are parallel with the direction of movement respectively of the slide and of the feeler there being further provided, means for the measurement of the movements of the slide in relation to the chassis and of the feeler in relation to the slide.

With these arrangements, the slide moves perpendicularly to the tools supported on the tool carrier and is brought into a predetermined position so that the position of the particular tool is set by bringing the working face of the tool into the notch of the feeler which itself is set in relation to the slide.

According to one particular form of embodiment, the movement of the slide is measured directly by means of a sliding foot and the movement of the feeler is measured by means of a micrometer mounted on the slide.

According to another embodiment, graduated scales are provided in the vicinity of the paths of the slide on the chassis and of the feeler on the slide.

Further features and characteristics of the invention will appear from the detailed description given hereinafter with reference to the accompanying drawing. The description and the drawing are given only by way of illustration and of a non-limitative example.

Figure 1:
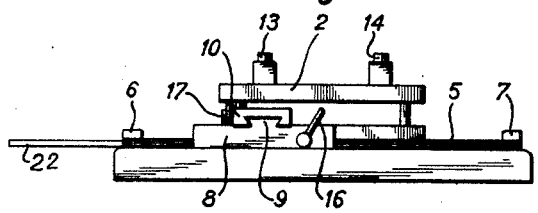
FIGURE 1 is an elevational view of the device according to the invention.
Figure 2:
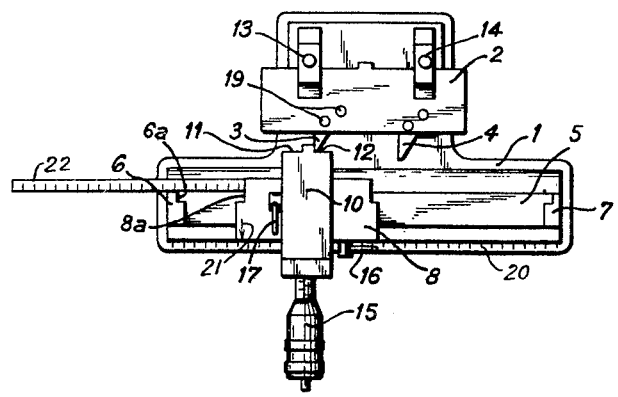
FIGURE 2 is a plan view of the same device.
Figure 3:
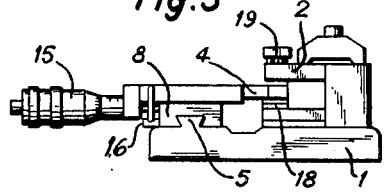
FIGURE 3 is a profile view thereof.

As shown in the drawing, the device according to the invention comprises a chassis 1 supporting a tool carrier 2 in which there are placed two adjustable tools 3 and 4. The chassis 1 comprises a guideway 5 of dovetail section limited at its end by two flanges 6 and 7 and upon which a movable slide 8 can move. Slide 8 includes a guideway 9 for setting means constituted by a feeler 10 which itself is movable in a direction perpendicular to that of the slide 8. The end of the feeler directed towards the tools is cut with two right-angled notches 11 and 12 the sides of which are parallel respectively with the direction of movement of the slide and that of the feeler.

The tool carrier 2 is intended to be fixed in a precise position on the lathe, thus it is fixed previously on the chassis in similar fashion by means of clamps 13 and 14.

Figure 4:
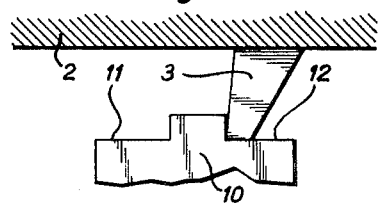
FIGURE 4 is a plan view on a larger scale of the end of the feeler.

In order to effect the setting of the tools, the slide 8 is brought to the desired reading or position, this reading being measured (by means of a sliding foot 22 for example) between a mark constituted by the face 6a of the flange 6 of the chassis and the face 8a of the slide 8. Alternatively, the position of the slide 8 relative to the chassis can be measured by aid of a graduated scale (as that shown by the reference 20 on FIGURE 1) marked on the chassis in front of the slide, this slide bearing an index 21 movable along the scale 20. Then, the position of the feeler 10 is determined by means of a micrometer 15 and the feeler 10 is shifted until the contact piece 15a of the micrometer bears against the face of the guideway 9. The slide 8 and the feeler 10 are locked in their position by means of levers 16 and 17. The tool to be set is placed in the tool carrier at a level such that the upper face of the tool is level with the upper face of the feeler 10. The height adjustment is effected by means of wedges 18 the thickness of which is a function of the machining dimension figure. The tool 3 is then moved transversely and longitudinally in the carrier until its edge comes to lodge exactly in the notch 11 if it is a "right-hand" tool, or in the notch 12 if it is a "left-hand" tool (FIGURE 4). When the tool is in correct position, it is locked by thumb screws 19.

The same procedure is utilized for the setting of the tool 4 and of any other tools. It is seen that, by reason of the arrangements of the invention, it is possible to set precisely the position of a plurality of tools spaced by a great distance which can be equal, or almost so, to the travel of the slide 8. On the other hand, in the known devices, the measuring instruments were fixed and their feelers could not move more than a few millimetres.

When the position figures of the tools are not known, for example when a task is carried out for the first time, a commencement is made by placing the first tool approximately and its co-ordinates are determined by reading the micrometer 15 and a sliding foot for the dimension FIGURES 6a–8a. Then, the position of the other tools is determined by reference to the co-ordinates of the first and with reference to the working plans. Then, when the tool carrier is transferred to the machine itself, the position of the first tool (and thus of the assembly of the others) may be adjusted with the aid of appropriate means mounted on the machine. When the same workpiece is produced again, this position is rapidly found again by means of measuring rods.

The invention is not limited to the single form of embodiment as described and represented, but on the contrary covers all the variants of embodiments and applications thereof.

I claim:

1. In combination: A setting device, and a tool carrier having a plurality of tools each of which is adapted for being fixed in an adjustable position in the tool carrier, the setting device comprising a chassis, means detachably securing the tool carrier on the chassis, a slide, means slidably supporting the slide on the chassis for movement parallel to a first axis, means for determining the position of said slide relative to a fixed location, setting means for setting the positions of the tools on the tool carrier, means supporting the setting means on said slide for movement in the direction of a second axis extending perpendicular to the movement of the slide, said setting means including surfaces parallel to said axes and defining a right-angle notch, means for determining the position of the setting means relative to the slide in the direction of movement of the setting means relative to the slide, whereby said setting means may be located in predetermined positions relative to said fixed location, said notch of the setting means being adapted for accommodating a tool therein for each position of the setting means whereby a plurality of tools may each be successively positioned relative to said fixed location by adjusting the respective positions of the tools in the notch of the setting means with the latter appropriately adjusted relative to the fixed location.

2. In combination: A setting device, and a tool carrier having a plurality of tools which are adapted for being fixed in an adjustable position in the tool carrier, the setting device comprising a chassis, means detachably supporting the tool carrier in fixed position on the chassis, a slide, means slidably supporting the slide on the chassis for movement parallel to a first axis, means for determining the position of said slide relative to a fixed location on said chassis, setting means for setting the positions of the tools on the tool carrier, means supporting the setting means on said slide for movement in the direction of a second axis extending perpendicular to the movement of the slide, said setting means including surfaces parallel to said axes and defining a right-angle notch, means for determining the position of the setting means relative to the slide in the direction of movement of the setting means relative to the slide, whereby said setting means may be located in a predetermined position relative to said fixed location, said notch of the setting means being adapted for individually accommodating the tools and for locating each tool in the tool carrier in a predetermined position whereby a plurality of tools can be adjusted in a tool carrier by a single setting device.

3. In combination with a tool carrier, a setting device having a chassis adapted for detachably supporting said tool carrier, said chassis supporting said tool carrier in a position corresponding to the position in which the tool carrier is supported in a machine, the setting device being adapted for cooperating with a plurality of tools which are adapted for being fixed in an adjustable position in the tool carrier, the setting device comprising: a movable slide, means supporting the movable slide for movement relative to the chassis in a direction parallel to a first axis of movement of the tools and lengthwise of the chassis for a distance including all of said tools, setting means for setting the positions of the tools on the tool carrier, means supporting said setting means for movement on said slide in the direction of a second axis extending perpendicular to the movement of the tools, said setting means having an end facing said tools and adapted for cooperating therewith such that said tools can be located in respective positions corresponding to the associated position of the end of the setting means, said setting means at said end having a right-angle notch with mutually perpendicular surfaces each of which is parallel to a respective direction of movement of the tools, said setting means at said end thereby being adapted for accommodating said tools to respectively locate the tools in both directions of movements thereof relative to the setting means end, and means for respectively determining the location of the setting means end relative to the chassis in both of said directions of movement of the tools.

4. The combination as claimed in claim 3, wherein said means for determining the location of the setting means end comprises means for determining the location of the slide relative to the chassis and a micrometer for determining the position of the setting means relative to said slide.

5. The combination as claimed in claim 4, wherein said means for determining the location of the slide relative to the chassis includes a sliding foot adapted for cooperating with a fixed location on said chassis and said slide.

6. The combination as claimed in claim 4, wherein said means for determining the location of the slide relative to the chassis includes graduated scales on the chassis and the slide extending in directions parallel to the direction of movement of the slide relative to the chassis.

References Cited by the Examiner

UNITED STATES PATENTS

| | | | |
|---|---|---|---|
| 1,283,868 | 11/18 | Nefedov. | |
| 1,661,334 | 3/28 | Helfgott | 33—172 X |
| 2,000,476 | 5/35 | Schmidt | 33—185 |
| 2,171,589 | 9/39 | Miller | 33—179.55 |
| 2,380,593 | 7/45 | Hanes | 33—185 |
| 2,391,878 | 1/46 | Cassia | 82—36 |
| 2,443,704 | 6/48 | Fersing | 33—185 |
| 2,659,158 | 11/53 | Cobb | 33—179.5 |

FOREIGN PATENTS

| | | |
|---|---|---|
| 147,302 | 7/52 | Australia. |
| 557,681 | 3/60 | Belgium. |
| 1,119,375 | 6/56 | France. |

ISAAC LISANN, *Primary Examiner.*